US010517780B2

(12) United States Patent
Peskin et al.

(10) Patent No.: US 10,517,780 B2
(45) Date of Patent: Dec. 31, 2019

(54) REMOVABLE POWER ASSIST FOR MANUAL WHEELCHAIR

(71) Applicant: RODA FUTURA, LLC, Miami, FL (US)

(72) Inventors: Evan Peskin, Miami, FL (US); Vivek Nagar, Bronx, NY (US); Audrey Wilson, Miami, FL (US); Jonathan Slavin, Beachwood, OH (US)

(73) Assignee: RODA FUTURA, LLC, Miami, FL (US)

( * ) Notice: Subject to any disclaimer, the term of this patent is extended or adjusted under 35 U.S.C. 154(b) by 0 days.

(21) Appl. No.: 16/395,391

(22) Filed: Apr. 26, 2019

(65) Prior Publication Data

US 2019/0328592 A1 Oct. 31, 2019

Related U.S. Application Data

(60) Provisional application No. 62/663,289, filed on Apr. 27, 2018.

(51) Int. Cl.
*A61G 5/04* (2013.01)
*A61G 5/02* (2006.01)
*A61G 5/08* (2006.01)

(52) U.S. Cl.
CPC ............ *A61G 5/047* (2013.01); *A61G 5/023* (2013.01); *A61G 5/08* (2013.01); *A61G 5/046* (2013.01); *A61G 2203/14* (2013.01); *B60Y 2200/84* (2013.01)

(58) Field of Classification Search
CPC ........... A61G 5/04; A61G 5/047; A61G 5/048
See application file for complete search history.

(56) References Cited

U.S. PATENT DOCUMENTS

| 1,273,684 | A | * | 7/1918 | Small | A61G 5/047 180/15 |
|---|---|---|---|---|---|
| 2,798,565 | A | * | 7/1957 | Rosenthal | A61G 5/045 180/298 |
| 3,100,547 | A | * | 8/1963 | Rosenthal | A61G 5/045 180/6.5 |
| 3,100,860 | A | | 8/1963 | Rosenthal | |
| 3,786,887 | A | | 1/1974 | Rosenthal et al. | |
| 3,814,199 | A | | 6/1974 | Jones | |

(Continued)

FOREIGN PATENT DOCUMENTS

| WO | 1992010157 | 6/1992 |
|---|---|---|
| WO | 2004047707 | 11/2002 |

*Primary Examiner* — Erez Gurari
(74) *Attorney, Agent, or Firm* — Coastal IP LLC; Kelly Hollowell

(57) ABSTRACT

Disclosed is a device for converting a manual wheelchair into an electronic wheelchair is provided. The device includes a joystick, a communication unit, a motor, a retractable friction roller, an engagement unit and a power source. The joystick is operably connected to a communication unit. The communication unit is operably connected to a motor. The motor includes an axle connected to a rotor. The retractable friction roller is mounted on the axle. The roller is placed in contact with a wheel of a manual wheelchair. The engagement unit is attached to the manual wheelchair to detachably attach the friction roller and the wheel. The power source is operably connected to the motor and the joystick.

14 Claims, 5 Drawing Sheets

(56) References Cited

U.S. PATENT DOCUMENTS

| | | | | |
|---|---|---|---|---|
| 3,893,529 | A * | 7/1975 | Karchak, Jr. | A61G 5/045 180/342 |
| 4,050,533 | A * | 9/1977 | Seamone | A61G 5/045 180/6.5 |
| 4,140,192 | A | 2/1979 | Sharpe | |
| 4,141,094 | A | 2/1979 | Ferguson et al. | |
| 4,296,361 | A | 10/1981 | Archer | |
| 4,422,515 | A * | 12/1983 | Loveless | A61G 5/045 180/6.5 |
| 4,641,720 | A | 2/1987 | Young | |
| 4,652,026 | A * | 3/1987 | Byrge | A61G 5/022 280/246 |
| 4,805,711 | A * | 2/1989 | Lautzenhiser | A61G 5/045 180/342 |
| 4,961,473 | A * | 10/1990 | Jones | A61G 5/045 180/6.5 |
| 5,156,226 | A | 10/1992 | Boyer et al. | |
| 5,222,567 | A * | 6/1993 | Broadhead | A61G 5/047 180/15 |
| 5,542,690 | A * | 8/1996 | Kozicki | A61G 5/045 180/907 |
| 5,555,949 | A | 9/1996 | Stallard et al. | |
| 5,562,174 | A | 10/1996 | Chen | |
| 5,735,363 | A * | 4/1998 | Horovitz | A61G 5/045 180/206.8 |
| 5,762,154 | A * | 6/1998 | Hsu | A61G 5/047 180/15 |
| 5,938,282 | A * | 8/1999 | Epple | B60N 2/797 297/217.3 |
| 6,050,356 | A | 4/2000 | Takeda et al. | |
| 6,145,612 | A * | 11/2000 | Dickie | |
| 6,273,212 | B1 * | 8/2001 | Husted | A61G 5/045 180/221 |
| 6,371,228 | B1 * | 4/2002 | Husted | A61G 5/045 180/65.1 |
| 6,547,018 | B1 * | 4/2003 | Choi | A61G 5/045 180/11 |
| 7,484,746 | B2 | 2/2009 | Mills | |
| 7,581,604 | B2 * | 9/2009 | Torita | A61G 5/045 180/6.48 |
| 9,050,226 | B2 | 6/2015 | Husted et al. | |
| 10,124,666 | B2 * | 11/2018 | Cunningham | A61G 5/022 |
| 2002/0019686 | A1 * | 2/2002 | Ulrich | A61G 5/045 701/1 |
| 2004/0007401 | A1 * | 1/2004 | Chu | A61G 5/047 180/13 |
| 2005/0269797 | A1 | 12/2005 | Mitchell | |
| 2006/0096792 | A1 * | 5/2006 | Usherovich | A61G 5/045 180/11 |
| 2010/0193278 | A1 | 8/2010 | Husted et al. | |
| 2011/0308880 | A1 * | 12/2011 | Chiu | A61G 5/047 180/312 |
| 2012/0080243 | A1 * | 4/2012 | Mulhern | A61G 5/047 180/11 |
| 2014/0183930 | A1 * | 7/2014 | Wei | A61G 5/1032 301/6.5 |
| 2014/0232085 | A1 * | 8/2014 | Hsiao-Wecksler | A61G 5/023 280/250.1 |
| 2018/0280213 | A1 * | 10/2018 | Hancock | A61G 5/047 |

* cited by examiner

REMOVABLE POWER ASSIST FOR MANUAL WHEELCHAIR

CROSS-REFERENCE TO RELATED APPLICATION

This application claims priority to a U.S. Provisional Application No. 62/663,289 filed on Apr. 27, 2018, the entire contents of which are incorporated herein by references in its entirety.

BACKGROUND OF THE INVENTION

The present application generally relates to a removable power assist for a manual wheelchair, and more particularly relates to a device for converting or retrofitting a manual wheelchair into an electric wheelchair.

In 2011, an estimated 2.7 million Americans used a wheelchair on a regular basis; up from 1.8 million in 1995. Based off the 2011 Census, 46,000,000 Americans are disabled and receiving income-based assistance. Of that group, 18.2% report ambulatory difficulty. There is also a population that needs a wheelchair temporarily e.g. 2-12 months and would prefer not to incur the expense of an electronic wheelchair even though it is preferred over a manual wheelchair.

Electronic wheelchairs and many of the innovations in the field are very expensive; and there is a significant price gap between the most expensive manual wheelchair and the cheapest electronic wheelchair, which often ranges in the thousands of dollars. Other limitations of electric wheelchairs, in addition to cost, include: portability (foldable); weight; and structural bulk. There are devices on the market for converting manual wheelchairs to electronic wheelchairs but they are flawed so that they cannot be installed by an end user sitting in the chair, are heavy, not portable, have poor surface contact for the propulsion system and/or cannot be disengaged without uninstalling the device from the chair.

What is needed is a device for converting a manual wheelchair into a power driven system in a cost effective, portable, easy to install and use, lightweight, alternately convertible from electric to manual without uninstalling the device. The device should be adaptable to existing manual wheelchairs without the need of professional installation.

SUMMARY OF THE INVENTION

In accordance with teachings of the present invention a device for converting a manual wheelchair into an electronic wheelchair is provided. Herein described is a manual wheelchair accessory device configured to attach to a manual wheelchair that will convert the manual wheelchair to an electric wheelchair, while still retaining the advantages that manual wheelchairs provide. The device includes an attachable power source affixed to a standard manual wheelchair.

In one embodiment, the present invention provides a device having a joystick, a communication unit, one or two motor(s), one or two retractable friction roller(s), an engagement unit and one or two power source(s). The joystick is operably connected to a communication unit. The communication unit is operably connected to one or two motor(s). Each motor includes an axle connected to a rotor. A retractable friction roller is mounted on the axle. The roller is placed in contact with a wheel of a manual wheelchair. The engagement unit is attached to the manual wheelchair to detachably attach the friction roller to the wheel. The power source is operably connected to the motor and the joystick.

In one embodiment, the present invention provides a second motor that is operably connected to the communication unit and the power source. The communication unit is operably connected to the joystick. The second motor includes a second axle connected to a second rotor. This embodiment includes a second friction roller that is mounted on the second axle. The second roller is placed in contact with a second wheel of the manual wheelchair to facilitate powered motion. In another embodiment, the joystick may be operably connected to the rotors and is operably programmable to generate commands for the motors.

The present invention easily converts a manual wheelchair to a powered, smart wheelchair. Features of the present invention include 1) using the friction roller's contact to the wheel to generate directed force; 2) the ability to engage and disengage the friction roller to the wheels of the wheelchair which allows the user to propel the wheelchair with manual propulsion while the device is disengaged but still attached to the wheelchair—a feature essential if the battery or motor cease to function; 3) the ability to fold the wheelchair with device attached to it without altering the folding of or normal space occupied by a standard manual wheelchair; 4) unit portability. In one embodiment, the device includes a safety guard to prevent a user's fingers from becoming caught in the motor or the gears. In another embodiment, the motors are bi-directional and independent of one another so that the motor attached to each wheelchair wheel can turn the opposite direction and rotate the wheelchair in place. Using the present invention, both acute and long-term care wheelchair companies and individual users can affordably bring their equipment and standard of care to a higher, professional level.

DETAILED DESCRIPTION OF DRAWINGS

While various embodiments of the present disclosure are disclosed, it should be understood that they are presented as examples only, and are not intended to be limiting. Similarly, the drawings and diagrams depict structural or architectural examples or alternate configurations of the invention, which are provided to aid in understanding the features and functionality of the various embodiments of the invention but are not intended to be limiting. The embodiments and features may be implemented and/or altered in a variety of ways known to those of ordinary skill the art.

Figure 1:
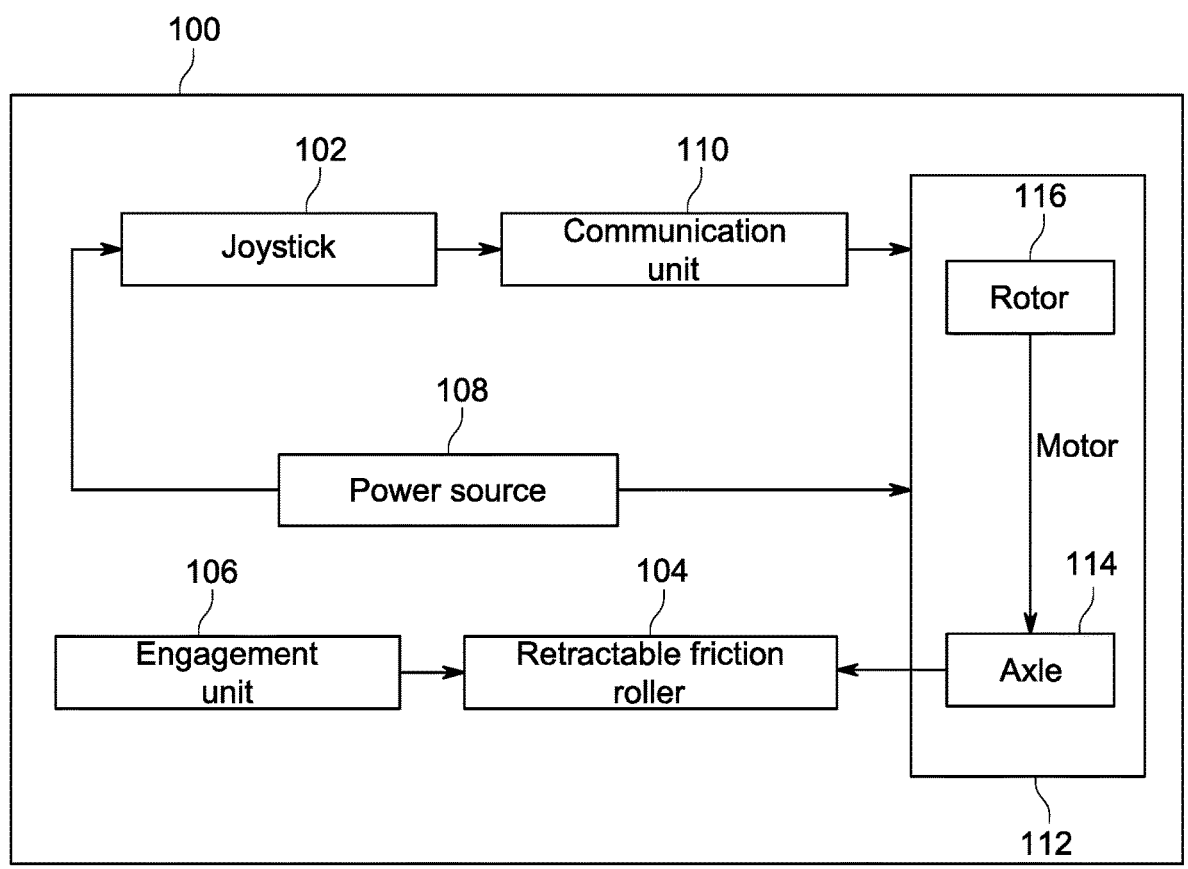
FIG. 1 illustrates a block diagram of a device in accordance with an embodiment of the present invention.

FIG. 1 illustrates a block diagram of the device 100 in accordance with one embodiment of the present invention. In this embodiment, the device 100 includes a joystick 102, at least one retractable friction roller 104, along with associated engagement unit 106 and a power source 108. The joystick 102 is operably connected to a communication unit 110. The joystick 102 is explained in detail in conjunction with FIG. 2 and FIG. 3 of the present invention.

The communication unit 110 is operably connected to a motor 112. The communication unit 110 is explained in detail in conjunction with FIG. 2 of the present invention. The motor 112 includes an axle 114 and a rotor 116. The motor 112 is explained in detail in conjunction with FIG. 3 of the present invention. The axle 114 is shown and explained in detail in conjunction with FIG. 4 of the present invention.

The retractable friction roller 104 is mounted on the axle 114. During operation of the device 100, the retractable friction roller 104 is put in contact with at least one wheel 206 (show in FIG. 2) of a manual wheelchair 202 (shown in FIG. 2). The retractable friction roller 104 is explained in detail in conjunction with FIG. 3 and FIG. 4 of the invention.

Figure 2:
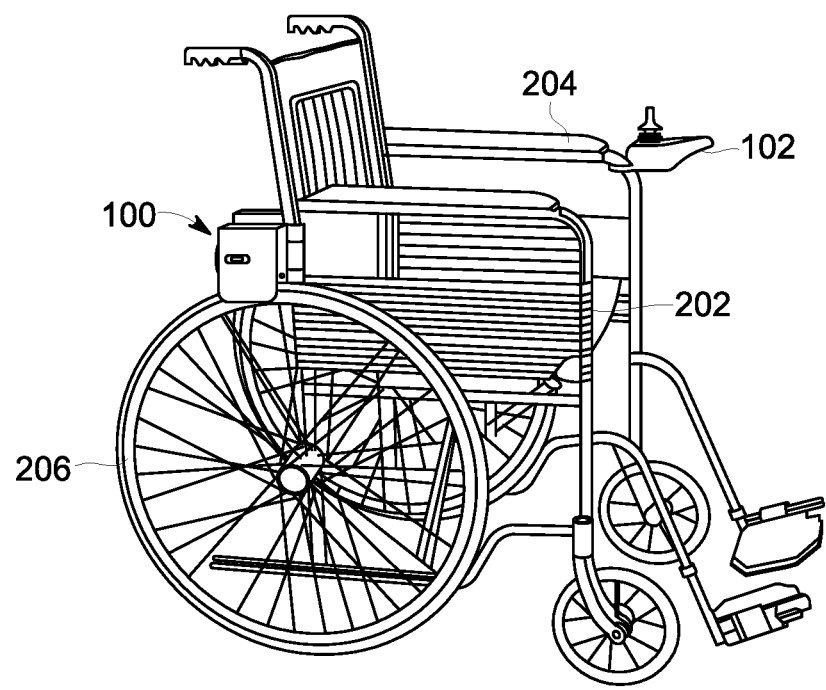
FIG. 2 illustrates a side view of a device attached to a manual wheelchair in accordance with an embodiment of the present invention.

The engagement unit 106 is attached to the wheelchair 202 (shown in FIG. 2) to detachably attach the retractable friction roller 104 and the wheel (shown in FIG. 2). The engagement unit 106 is explained in detail in conjunction with FIG. 3, FIG. 4 and FIG. 5 of the present invention. The power source 108 is operably connected to the motor 112 and the joystick 102. The power source 108 is shown and explained in detail in conjunction with FIG. 5 of the present invention. The device 100 converts the manual wheelchair 202 into an automatic wheelchair.

FIG. 2 illustrates a side view of one embodiment of device 100 attached to a manual wheelchair 202. The joystick 102 allows the user to control the direction and speed of the motor 112 (shown in FIG. 2). In an embodiment, the joystick 102 is attached to an arm 204 of the manual wheelchair 202.

In one embodiment, a user is able to control the direction, movement and speed of the device 100 using the joystick 102. More specifically, the movement and speed of the wheel 206 of the wheelchair 202 is controlled by an end-user using the joystick 102 and the communication unit 110 (shown in FIG. 3).

In one embodiment, the joystick 102 is programmable and enabled to store instructions for controlling the speed and direction of motor 112 (shown in FIG. 1). The joystick 102 receives power from the power source 108 (shown in FIG. 1). The use of a battery operated joystick is known for controlling power wheelchairs.

In one embodiment, the power source 108 is a battery. The batteries may be rechargeable such as but not limited to using an ordinary 110V or 220V charger. Sample batteries that may work with this device include but are not limited to a primary battery (non-chargeable) and secondary batteries such as Lithium-ion (Li-ion), Nickel Cadmium (Ni—Cd), Nickel-Metal Hydride (Ni-MH) and Lead-Acid.

Figure 3:
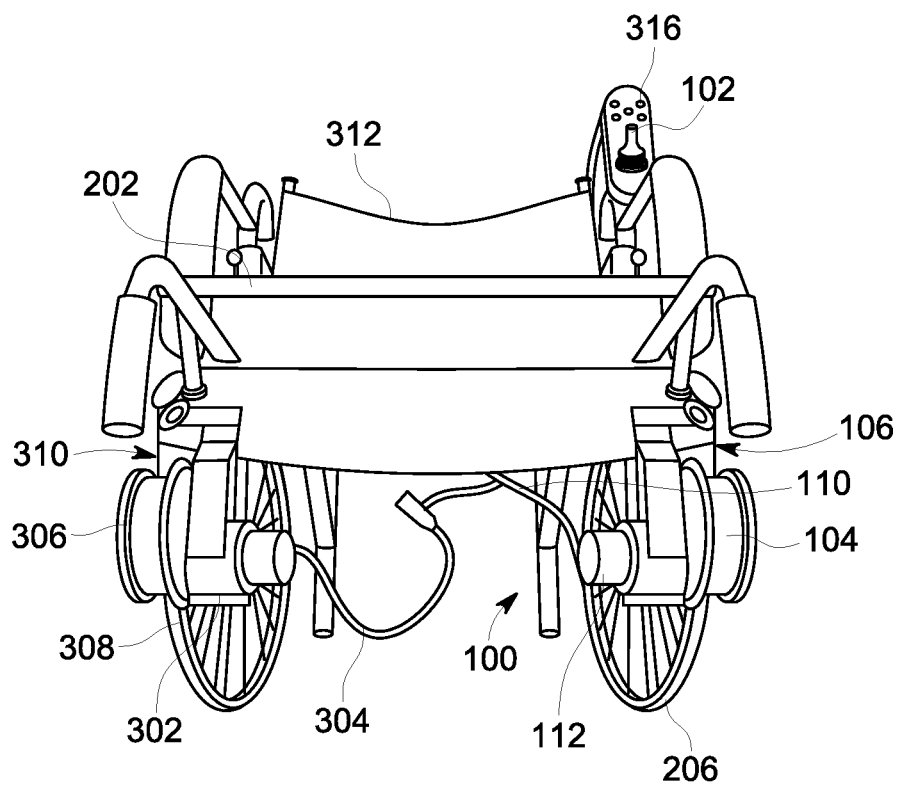
FIG. 3 illustrates a top perspective view of the device attached to the manual wheelchair in accordance with an embodiment of the present invention.

FIG. 3 illustrates a top perspective view of the device 100 attached to the manual wheelchair 202 in accordance with an embodiment of the present invention. In this configuration, the retractable friction roller 104 is mounted on the axle 114 (shown in FIG. 1) and rotated by activation of the motor 112.

In one embodiment, the device includes a brushless hub motor with a friction surface. Types of motors that may be used include but are not limited to a geared hub motor, a brushed hub motor, a brushless geared hub motor, a brushed geared hub motor, a brushed geared hub motor, or any other similar motor. Hub motors are very common in power wheelchairs but are typically used for separate wheels that contact the ground directly. Friction surfaces may include but are not limited to high friction surface treatments, high friction polymers and high friction detailing applied to the surface that contacts the wheelchair wheel.

In the present invention, the retractable friction roller 104 is placed in contact with at least one wheel 206 of the manual wheelchair 202 to rotate the wheel 206 and move the wheelchair 202. The retractable friction roller 104 rotates the wheel 206 by friction force. This is a unique feature of the present invention. Other devices are commonly based on motor to ground movements, PAW uses a friction roller to the wheel to generate movement.

In one embodiment, the retractable friction roller 104 is shaped to have a centerless concave rim housing configured to provide high friction surface facing the wheel 206 of the wheelchair 202. The centerless concave rim housing acts as a wheel hub to yield a high percentage of surface contact. In one embodiment, the high friction surface of the retractable friction roller 104 faces the wheelchair wheel 206 and is customizable to fit the curve and or size of the wheel 206.

In an embodiment, the material of high friction surface of the retractable friction roller 104 is rubber or polyurethane. However, it would be readily apparent to those skilled in the art that various types of material such as silicone, foam, sand paper, grit tape, sponge-rubber foam etc. may be envisioned without deviating from the scope of the present invention. In another embodiment, the wheels 206 of wheelchair 202 are made using a high friction surface, and the roller 104 is made of steel, aluminum or other similar hardened, textured surface.

The motor 112 is configured to rotate the retractable friction roller 104. The retractable friction roller 104 is mounted on the axle 114 (shown in FIG. 1) and the rotor 116 (shown in FIG. 1) rotates the first axle resulting in rotation of the retractable friction roller 104. In an embodiment, the motor 112 is a brushless DC motor with a friction surface. However, it would be readily apparent to those skilled in the art that various types of motor such as geared hub motor, brushed hub motor, brushed geared hub motor etc. may be envisioned without deviating from the scope of the present invention.

In another embodiment, the device 100 further includes a second motor 302 operably connected to the communication unit 110 and the power source 108 (shown in FIG. 1). The communication unit 110 splits into another communication unit 304 that operably connects to the second motor 302. The communication unit 110 and the another communication unit 304 are both operably connected to the joystick 102. In another embodiment, the joystick 102 further include control buttons 316 operably connected to the motor. The control buttons 316 controls speed of the motor 112 (shown in FIG. 3).

In an embodiment, the communication unit 110 and the another communication unit 304 is a single wired (not shown) communication unit operably connected to the joystick 102. Examples of the communication unit 110 and the another communication unit 304 include but not limited to cables, wires, Bluetooth, NFC. It would be readily apparent to those skilled in the art that various types of communication unit such as wired or wireless unit may be envisioned without deviating from the scope of the present invention.

The second motor 302 includes a second axle (not shown) connected to a second rotor (not shown). In this embodiment, the device 100 further includes a second friction roller 306 mounted on the second axle (not shown). The second roller 306 is placed in contact with a second wheel 308 of the manual wheelchair 202. Alternatively, the second roller 306 is mounted to the axle 114 and the motor 112 provides motor torque to rotate the second friction roller 306 and the friction roller 104 (not shown).

Similarly, to the retractable friction roller 104, the second retractable friction roller 306 includes a centerless concave rim housing configured to provide high friction surface facing the second wheel 308 of the wheelchair 202. The principle and function of the second motor 302 and second friction roller 306 is the same as the motor 112 and retractable friction roller 104 as previously described.

In another embodiment of the present invention, the device 100 further includes a second engagement unit 310 attached to the manual wheelchair 202 to detachably attach the second friction roller 306 and the second wheel 308 of the wheelchair 202. The engagement unit 106 detachably attaches the friction roller 104 and the wheel 206. The engagement unit 106 and the second engagement unit 310 is attached behind seating area 312 of wheelchair 202 and top of the wheel 206 and the second wheel 308 respectively.

Figure 4:
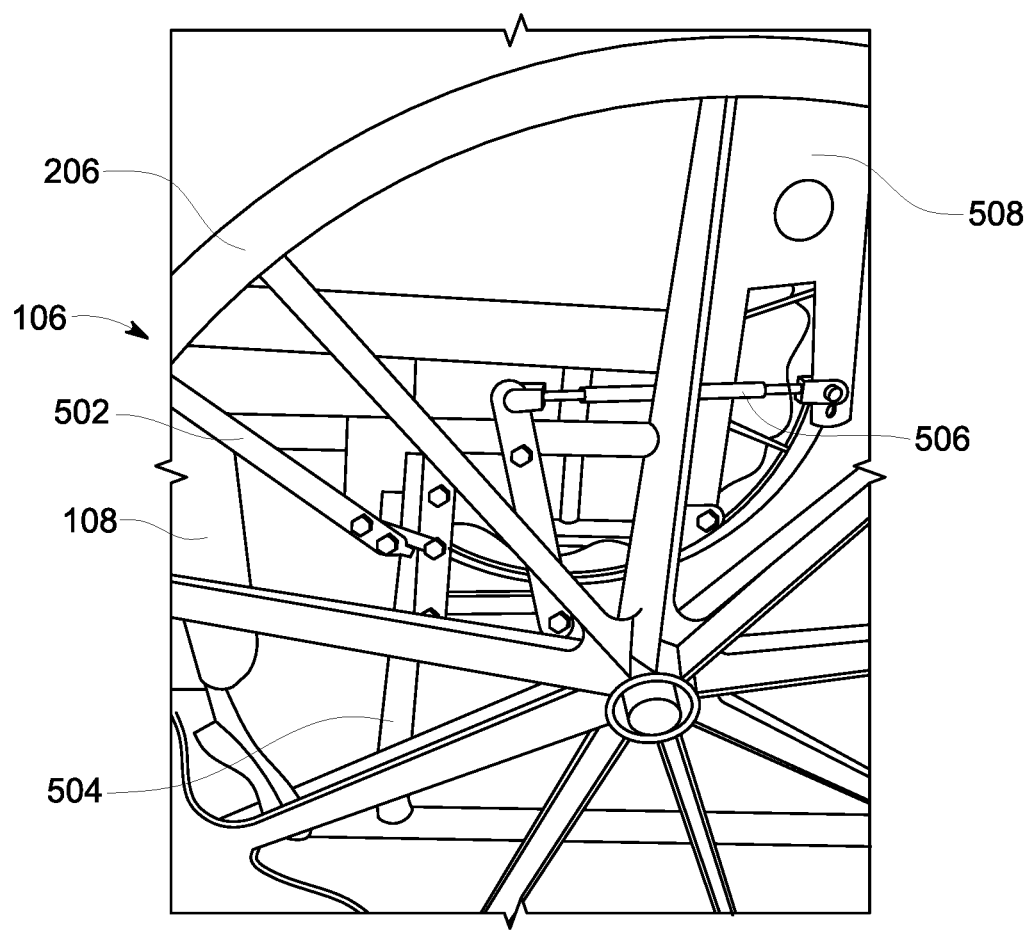
FIG. 4 illustrates a perspective view of an engagement unit in accordance with another embodiment of the present invention.

FIG. 4 illustrates perspective view of engagement unit 106 in accordance with another embodiment of the present invention. The engagement unit 106 includes a lever 502 operably connected to a lever mechanism unit 504, a turnbuckle 506 connected to the lever mechanism unit 504 and an attachment unit 508 operably connected to the turnbuckle 506. The attachment unit 508 comprises clamps (shown in FIG. 5) and a spring loaded unit (shown in FIG. 5).

In one embodiment of the device, the retractable friction roller (104, shown in FIG. 3) is operably connected to the turnbuckle 506. The lever 502 is actuated by the user and results in engaging and disengaging of the retractable friction roller (104, shown in FIG. 3) from the wheel 206. Thus the lever 502 results in converting a manual wheelchair into a powered wheelchair and vice versa.

With reference to FIG. 1, in an embodiment of the present invention, the power source 108 is a battery. The batteries are chargeable using an ordinary 110V or 220V charger. Examples of battery include but not limited to primary battery (rechargeable) and secondary batteries (non-rechargeable), including but not limited to batteries such as Lithium-ion (Li-ion), Nickel Cadmium (Ni—Cd), Nickel-Metal Hydride (Ni-MH), and Lead-Acid.

Figure 5:
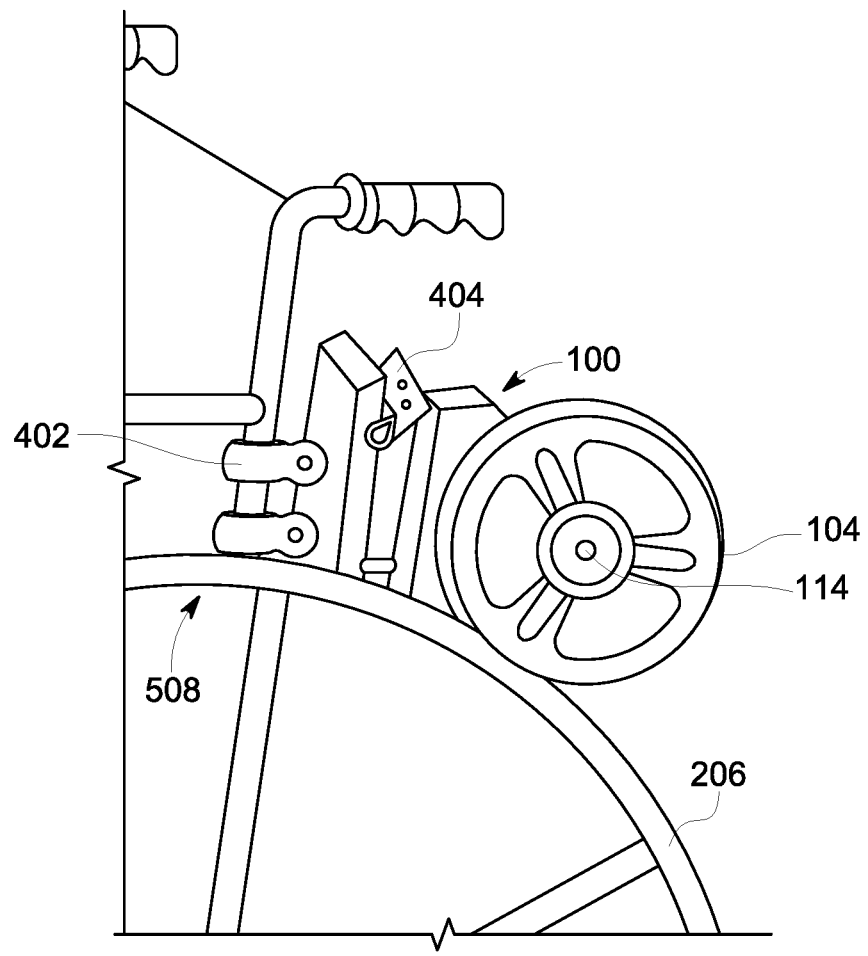
FIG. 5 illustrates a perspective view of the device in accordance with another embodiment of the present invention.

FIG. 5 illustrates perspective view of the device 100 in accordance with another embodiment of the present invention. The attachment clamps 402 and a spring loaded unit 404 engage and disengage the retractable friction roller 104 and the wheel 206.

With reference to FIG. 1, the friction roller 104 is mounted on the axle 114. In an embodiment of the present invention, the friction roller 104 has an opening to receive the axle 114. The axle 114 is a cylindrical elongated rod to pass through the opening to rotate the friction roller 104 on receiving motor torque from the rotor (116, shown in FIG. 1).

Examples of the attachment unit 508 include simple mechanical devices such as but not limited to a curved-head bolt, bolt, carriage bolt, T-bolt, T head bolt, round head bolt, barrel bolt, hex-head bolt, spring, screw clamp, mechanical coupling, latch, rod clamp, rail clamp, light, round center mount, mount bracket, pole clamp, pipe clamp, quick release clamp, rack clamp mount, or handlebar clamp mount on the backrest frame of wheelchair 202 and provides contact between the friction roller 104 and the wheelchair wheel 206 respectively.

The total weight for the entire device 100 is approximately 20 pounds. It is expected that the speed is 0-5 MPH adjustable, maximum carrying capacity of around 300 pounds, with a maximum incline of around 10 degrees.

It would be readily apparent to those skilled in the art that second retractable friction roller; second engagement unit; and second motor performs exactly same functions as described in the description for retractable friction roller; engagement unit; and motor respectively.

In other embodiments one of ordinary skill in the art will be able and may make changes to the size and materials of the friction roller; the size and type of motor or battery used; and/or the type of controller or joystick; and the size and type of attachment devices used to fix the device to the manual wheelchair such as but not limited to a screw clamp. In one embodiment a casing for each of the two units may be added for safety, convenient travel and appearance. In another embodiment, the device may be used as a power assist to any object that is traditionally transported on wheels via manual propulsion, such as baggage carts.

Potential limitations include the following: the device may not work if the maximum weight limit is exceeded; the maximum incline is exceeded; the friction roller is not engaged properly to the powertrain; operation on wet surfaces due to slippage, operation on ice, sand, or oily surfaces, if the battery, motor, or grip components are damaged or complete discharged, if the wheels are locked or do not freely rotate, or if operated in excessive heat.

In the foregoing description, it will be readily appreciated by those skilled in the art that modifications may be made to the invention without departing from the concepts disclosed herein. Such modifications are to be considered as included in the following claims, unless the claims by their language expressly state otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

What is claimed is:

1. A device comprising:
a joystick operably connected to a communication unit, the communication unit operably connected to a motor; said motor comprising an axle connected to a rotor;
a retractable friction roller comprising a centerless concave rim housing configured to provide a high friction surface facing a wheel of a manual wheelchair; wherein said roller is mounted on the axle and placed in contact with the wheel of the manual wheelchair;
an engagement unit attached to the wheelchair to detachably attach the retractable friction roller and the wheel; and
a power source operably connected to the motor and the joystick.

2. The device according to claim 1 further comprising a second motor operably connected to the communication unit and the power source.

3. The second motor according to claim 2 comprising a second axle connected to a second rotor.

4. The device according to claim 3 further comprising a second retractable friction roller mounted on the second axle, and said second roller placed in contact with a second wheel of the manual wheelchair.

5. The device according to claim 4 further comprising a second engagement unit attached to the manual wheelchair to detachably attach the second friction roller and the second wheel of the wheelchair.

6. The second retractable friction roller according to claim 4 comprising a second centerless concave rim housing configured to provide high friction surface facing the second wheel of the manual wheelchair.

7. The joystick according to claim 2 operably programmable to generate commands for the motor and the second motor.

8. The friction roller according to claim 1 contacts the wheel behind a seating area of the wheelchair.

9. The second friction roller according to claim 4 contacts the second wheel behind the seating area.

10. The engagement unit according to claim 1 further comprises:
a lever operably connected to a lever mechanism unit; said lever mechanism unit operably connected to a turnbuckle; and said turnbuckle operably connected to an attachment unit.

11. The second engagement unit according to claim 5 further comprises:
a second lever operably connected to a second lever mechanism unit; said second lever mechanism unit operably connected to a second turnbuckle; and said second turnbuckle operably connected to a second attachment unit.

12. The attachment unit according to claim 11 comprises:
a spring loaded unit operably connected to the retractable friction roller; and a clamp operably connected to the spring loaded unit.

13. The second attachment unit according to claim 12 comprises: a second operably connected to the second retractable friction roller; and a second clamp operably connected to the spring loaded unit.

14. A method for converting a manual wheelchair to electronic wheelchair comprising a step of using a device comprising:
a joystick operably connected to a communication unit, said communication unit operably connected to a motor; said motor comprising an axle connected to a rotor;
a retractable friction roller comprising a centerless concave rim housing configured to provide a high friction surface facing a wheel of a manual wheelchair; wherein said roller is mounted on the axle and placed in contact with the wheel of the manual wheelchair;
an engagement unit attached to the wheelchair to detachably attach the friction roller and the wheel; and
a power source operably connected to the motor and the joystick.

* * * * *